AMERICAN STANDARD CODE FOR INFORMATION INTERCHANGE (ASCII)

| $b_7$ $b_6$ $b_5$ → | | | | | 0 0 0 | 0 0 1 | 0 1 0 | 0 1 1 | 1 0 0 | 1 0 1 | 1 1 0 | 1 1 1 |
|---|---|---|---|---|---|---|---|---|---|---|---|---|
| Bits $b_4$ ↓ | $b_3$ ↓ | $b_2$ ↓ | $b_1$ ↓ | COLUMN → / ROW ↓ | 0 | 1 | 2 | 3 | 4 | 5 | 6 | 7 |
| 0 | 0 | 0 | 0 | 0 | NULL | DLE | SP | 0 | \ | P | @ | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENO | NACK | % | 5 | E | U | e | u |
| 0 | 1 | 1 | 0 | 6 | ACK | SYNC | & | 6 | F | V | f | v |
| 0 | 1 | 1 | 1 | 7 | BELL | ETB | ' | 7 | G | W | g | w |
| 1 | 0 | 0 | 0 | 8 | BS | CNCL | ( | 8 | H | X | h | x |
| 1 | 0 | 0 | 1 | 9 | HT | EM | ) | 9 | I | Y | i | y |
| 1 | 0 | 1 | 0 | 10 | LF | SS | * | : | J | Z | j | z |
| 1 | 0 | 1 | 1 | 11 | VT | ESC | + | ; | K | [ | k | { |
| 1 | 1 | 0 | 0 | 12 | FF | FS | , | < | L | ~ | l | — |
| 1 | 1 | 0 | 1 | 13 | CR | GS | - | = | M | ] | m | } |
| 1 | 1 | 1 | 0 | 14 | SO | RS | . | > | N | ^ | n | \| |
| 1 | 1 | 1 | 1 | 15 | SI | US | / | ? | O | _ | o | DEL |

FIG. 1

INVENTOR
P.R. ADAMS
BY J.W. WHITESEL
ATTORNEY

United States Patent Office 3,414,105

Patented Dec. 3, 1968

3,414,105

CLASS OF CHARACTER CONTROL CIRCUIT FOR EDITORIAL CORRECTING TYPEWRITER

Paul Riemann Adams, Upper Montclair, N.J., and James Warren Whitesel, Western Springs, Ill., assignors to International Telephone and Telegraph Corporation, New York, N.Y., a corporation of Maryland Filed Apr. 17, 1967, Ser. No. 631,293
19 Claims. (Cl. 197—20)

ABSTRACT OF THE DISCLOSURE

All characters and stunts are classified into one or more of a plurality of classes of characters. An automatic typewriter is adapted to print out a clean copy of text material. Responsive to a detection of any selected one or more of the classes of characters, the typewriter stops itself and the typist makes suitable corrections.

This invention relates to automatic typewriters and more particularly to automatic typewriters which include means for making editorial corrections in previously typed copy.

Automatic typewriters are machines for printing out a clean copy of a text responsive to command signals which were previously stored, as on a perforated tape, for example. Sometimes it is desirable to change or make editorial corrections in the copy represented by such stored signals. If it were necessary to manually retype the entire copy in order to make such corrections, many of the advantages of the automatic typewriter would be lost. Therefore, a desirable automatic typewriter has means for making such corrections, either directly on the tape or in the typed copy, with little or no manual retyping required.

One suggestion found in the prior art is that the typewriter should be adapted to unrestrictedly print out or type the copy stored on the tape, at high speed and without stopping, until it approaches a point in the text where a correction is to be made. Then, this known typewriter is switched first into a line-by-line mode and then into a word-by-word mode. In the line-by-line mode, the typewriter stops every time that it comes to the end of a line. The typist then restarts the typewriter, and it prints the next line, stopping at that line's end. When the typist sees that the next line to be printed should be modified to include the desired correction, she switches to a word-by-word mode of operation.

In the word-by-word mode of operation, this prior art typewriter types a single word and then it stops when it encounters a letter space (the space which separates letters into words). Each time the typewriter stops, the typist pushes a start key, and it types another word and stops again. The typewriter continues to type a word at a time, with restart after every word, until the typist observes the place in the printed copy where she wishes to make a correction. Then, she refrains from pushing the start key, and she types a correction instead. Thereafter, she again causes the typewriter to resume its unrestricted and automatic print out mode of operation until either another correction is required or the end of the copy is reached.

Usually, it is difficult for even a skilled typist to use these known typewriters unless she has special training. This is because the typewriter is designed to stop when it comes to a "spacing" type signal (i.e. a space, tab, or carriage return). These "spacing" type signals are, in effect, an arbitrary criterion selected by the person who designed the typewriter. They do not necessarily correspond to the expectations of the human typist. For example, the human typist may expect the typewriter to stop before it prints the period at the end of a sentence, but the "spacing" symbol comes after the period. Thus, it becomes difficult for a typist who wishes to add an "s", for example, to the end of a word, followed by a comma, period, or other punctuation because of the stop after the comma or period rather than at the end of the word itself. Other examples could also be cited to illustrate how the arbitrary "spacing" type criterion is so unnatural that it promotes error or frustration.

Accordingly, an object of the invention is to provide new and improved automatic typewriters for making editorial changes. Another object of the invention is to provide typewriters which stop at the spots in the printed out copy where a typist psychologically expects it to stop. More particularly, an object is to provide a typewriter which is better coordinated with respect to the expectations of its human operator.

In keeping with an aspect of the invention, these and other objects are accomplished by means of an automatic typewriter which classifies all of the possible command signals into a plurality of classes. In a preferred embodiment, these classes are letters, numbers, punctuation, spaces of various types, and control signals. Initially, the typewriter is placed in a first mode in which it prints out a line at a time, stopping after each carriage return. The typist manually restarts the typewriter after each line is printed out. Then, the typewriter is changed to a different mode of operation in which it stops each time that the command signals change from one class of characters to another. The typewriter may also be adapted so that the typist may stop it upon the change to any one selected class and cause it to ignore changes to other classes of characters.

The above mentioned and other features of this invention and the manner of obtaining them will become more apparent, and the invention itself will be best understood by reference to the following description of an embodiment of the invention taken in conjunction with the accompanying drawings, in which:

FIG. 1 is a table setting forth the American Standard Code for Information Interchange—the ASCII code;

Figure 2:
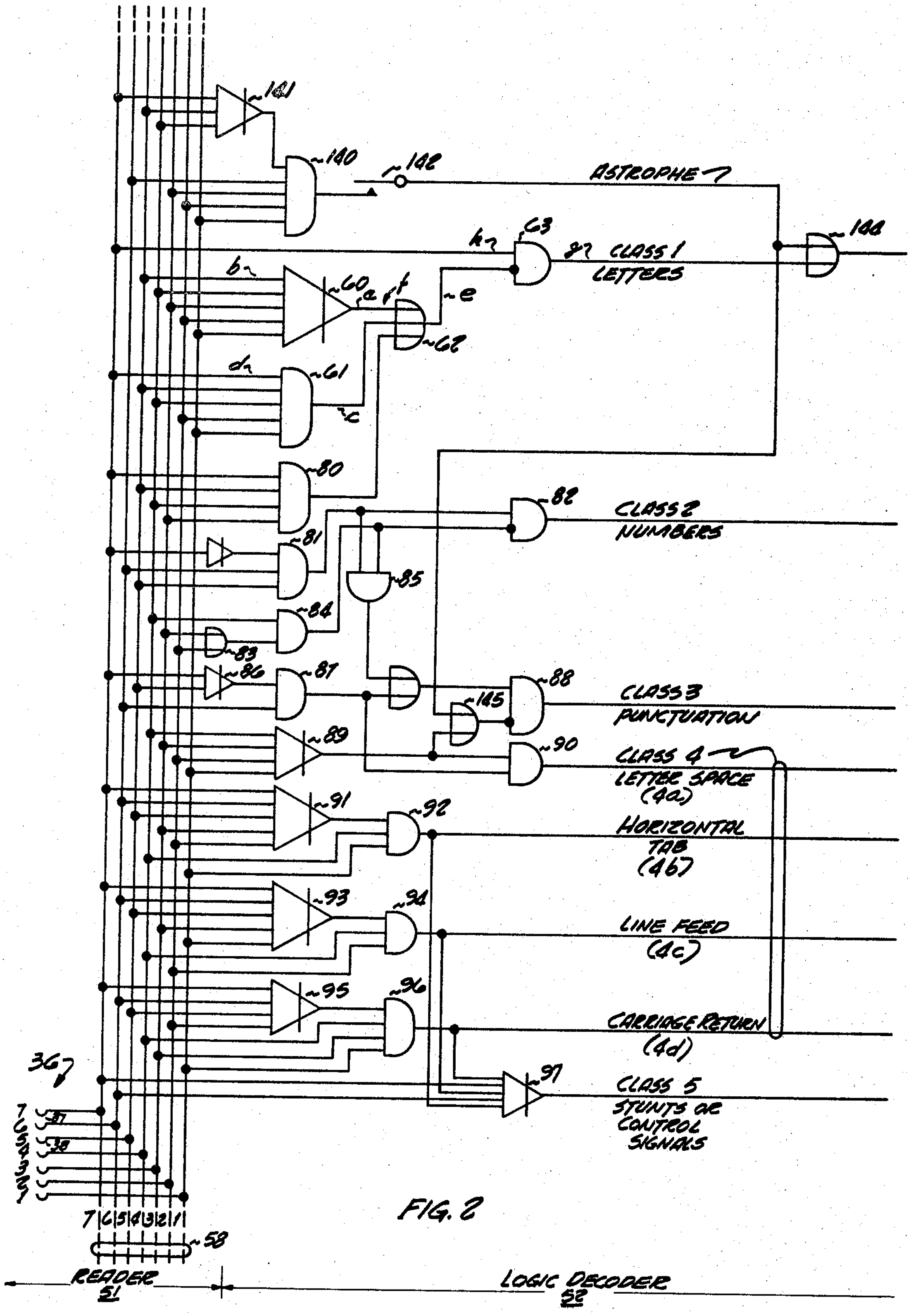
FIGS. 2 and 3 are a logic circuit diagram incorporating the principles of the invention in its most complex form.

FIG. 1 gives the ASCII code in the usual form. This code has been adopted by the American Standards Association to provide for a universal interchange of information. Each information item is expressed in this code as a seven element, binary word. The elements or bits are designated in the drawing by the notation $b_1, b_2, b_3, \ldots b_7$. The low-order bit is in the right-most position, and the high-order bit is in the left-most position. Therefore, a complete binary word is written in the order: $b_7, b_6, b_5, b_4, b_3, b_2, b_1$. Or, stated another way, the first three bit elements of each binary word appear at the top of each column, and the last four bit elements appear in the left-hand column. Thus, for example, the capital letter P is identified by the binary word 1010000—101 appearing at the top of the column "5" and 0000 appearing at the left-hand end of the row "0." Each of these binary words may be stored on any suitable medium, such as perforated or magnetic tape. Responsive to the read out of the stored word, the typewriter prints the indicated character or performs the indicated action (e.g. it may ring a bell, return the carriage, etc.).

It is here assumed that perforated tape is used. The principles of the invention are the same for other media; therefore, the following references to reading brushes and perforated tape should be constructed broadly to cover any suitable reading heads and storage media. Each of the seven elements of the binary word is stored in a corresponding one of seven tracks displaced longitudinally across the width of the tape. The number "1" indicates the presence of a perforation or hole, in the tape, and the number "0" indicates the absence of such a hole. Therefore, when the tape is perforated in only the first and third tracks, for example, the capital letter P is indicated, and the typewriter will print such a P. By an inspection of the table, all of the other binary words which may be found on a tape should be immediately apparent.

The seven brushes 36 (FIG. 2) read the perforated tape. A hole in the tape results in a potential on the corresponding brush. When the binary word 1010000 which represents the capital letter P is read, brushes 37 and 38 are energized through holes in the tape and none of the other brushes is energized.

The equipment includes a number of locking type keys (FIG. 3) which allow the typist to select any one of a number of modes of operation. If the toggle key 40 is thrown to the position shown in the drawing, the typewriter stops every time that it encounters a carriage return; thus, the typewriter may advance in a line-by-line mode. That is, it prints out a line of the copy stored on the perforated tape and then stops. When the key 40 is thrown to a raised position, it is enabled to stop on every change in a class of characters depending upon the positions of the keys 41–48.

Figures 3, 4:
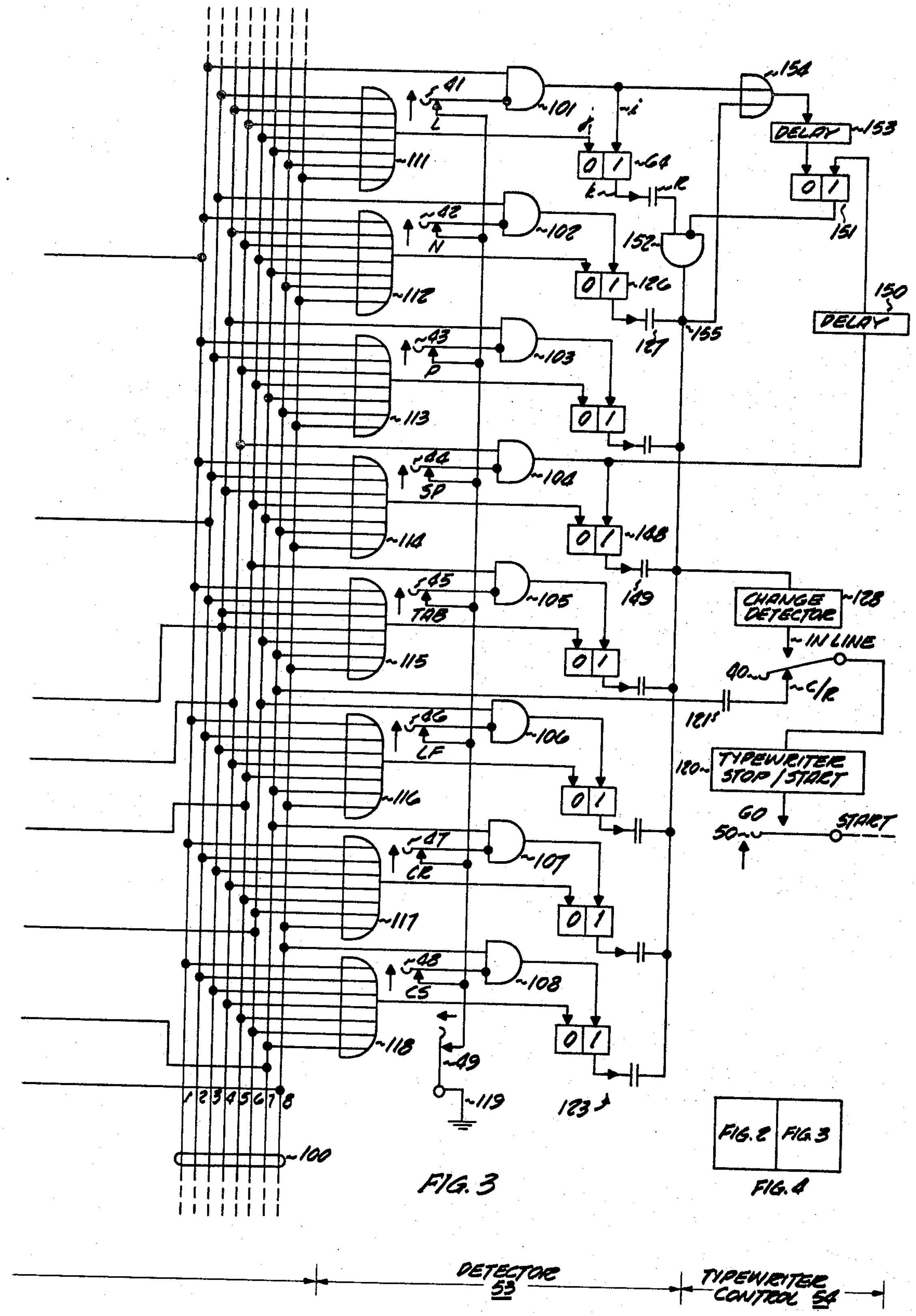
FIG. 4 shows how FIGS. 2 and 3 should be joined to provide a complete drawing.

The keys 41–48 classify the characters read out from the perforated tape by the brushes 36. The classes are: letters, numbers, punction, letter spacing, tab, line feed, carriage return, and stunt or control signals. In FIG. 3, the keys representing these classes are indicated by the letters L, N, P, SP, TAB, LF, CR, and CS respectively. Any one or more of these may be put into either of two positions an any time; each key remains in the position until it is changed by the typist. If a key is pushed to an operate position, the typewriter stops whenever the brushes 36 first encounter the indicated class of characters after it has been reading any other symbol. Thus, if key 41 is pushed to an operate position, for example, the typewriter stops whenever the brushes first read a letter after they have been reading any other class of characters. Likewise, key 42 causes the typewriter to stop when it first reads a number after it has been reading any other class. If all of the keys are pushed to an operate position, the typewriter stops each time that it encounters any change from any class of characters to any other class of characters. Or, if the key 49 is opened, it is equivalent to putting all keys in their operate position.

Any time after the typewriter has stopped, the typist may restart it by pushing a non-locking pushbutton 50 marked "GO". The restarted typewriter then proceeds to type the next characters represented by binary words stored on the tape. When the typewriter comes to the place where a correction is required, the typist does not push the "GO" push-button 50. Instead, she types the correction with any known results.

FIGS. 2 and 3 show a circuit for decoding and logically interpreting the data stored on the perforated tape. This figure may be divided into the major parts of a reader 51, a logic decoder 52, a dector 53, and a typewriter control circuit 54. The symbol 60 is a NOR gate which has an output signal unless it is marked at any one of its input terminals. The symbol 61 is an AND gate which has an output signal only when all of its inputs are marked simultaneously. The symbol 62 is an OR gate which has an output signal if any one of its inputs is marked.

The reader 51 includes the seven brushes 36 for simultaneously reading the seven tracks of a perforated tape. The three uppermost brushes 7, 6, 5, detect the bit elements indicated at the tops of the columns in FIG. 1. The four lowermost brushes 4–1 detect the bit elements indicated at the left-hand ends of the horizontal rows. Thus, as pointed out above, the capital letter P (binary word 1010000) is indicated when the brushes 37, 38 detect perforations and the remaining brushes do not detect any holes. By a comparison between the table of FIG. 1 and the brushes 36, it should be apparent how the tape is read. It should also be apparent that the brushes 36 apply potentials to the busses 58 in a similar coded combination. Therefore, for the letter P, a potential appears on busses 7 and 5, and no other.

Means are provided for separating the characters read off the perforated tape into classes. In greater detail, the logic decoder 52 uses the above described forms of gate circuits which are well known to those skilled in the art. The NOR gate 60 provides an output signal at *a* only if no input signal appears at any of the input terminals *b*. Therefore, the gate 60 conducts only if the brushes 36 detect the binary words XX00000. The two X marks indicate that the nature of the first two digits is irrelevant since the gate 60 is not connected to the busses 7 and 6. The AND 61 provides an output signal at *c* only if an input signal appears at each of the terminals *d*. Therefore, according to this disclosure, the gate 61 conducts only for the binary words 1X11X11. Again the X marks indicate the unconnected terminals which are irrelevant. The OR gate 62 gives an output signal at *e* if an input signal appears an any one or more of the terminals *f*. The inhibit gate 63 provides an output signal at terminal *g* if the uppermost gate terminal *h* is energized by a "1" signal and the lowermost inhibit terminal (marked by a heavily inked dot) is not energized by any signal. If the inhibit terminal is energized, no signal at *h* may reach the terminal *g* regardless of any electrical condition which may or may not prevail at the uppermost or gate terminal. The flip-flop 64 has two sides marked "0" and "1". Normally, it stands on side "0." If the input or set terminal *i* is energized, the flip-flop is set to side 1, and an output signal appears at output terminal *k*. If the input or reset terminal *j* is energized, the flip-flop 64 is reset to its "0" side, and the output signal disappears from the output terminal *k*.

The character classification arrangement of the logic decoder 52 may be understood by comparing the input terminals of the various gates with the table of FIG. 1. Thus, for example, gate 63 conducts when the first bit in any binary word is "1," unless it is inhibited at the terminal marked by the heavily inked dot. From the table of FIG. 1, it is seen that gate 63 conducts when the brushes 36 read out any of the columns 4–7. The output of gate 63 is inhibited under three conditions. The first inhibiting condition is the binary word XX00000 which is the top block in columns 0, 2, 4 and 6 (FIG. 1). Columns 0 and 2 are irrelevant since gate 63 cannot conduct when the first bit is "0". The second inhibiting condition is when AND gate 61 conducts for the binary word 1X11X11. This is obviously the space under the letter Z in columns 5 and 7. The third inhibiting condition is when AND gate 80 conducts for the binary word 1X111XX. These are the last four spaces in columns 5 and 7. A moment of reflection makes it clear that gate 63 conducts only when the bushes 36 read out from the perforated tape a binary word which represents a letter (i.e. class 1 is letters).

A similar comparison indicates that the AND gate 81 and, therefore, the inhibit gate 82, conduct for the binary words 011XXXX which is column 3 in the table of FIG. 1 Inhibit occurs for the binary words XXX11XX or XXX1X1X. From the table, column 3, the inhibit occurs when a punction symbol is read out by the brushes 36. Therefore, the gate 82 conducts whenever the brushes 36 read a number (i.e. class 2 is numbers).

The AND gate 85 conducts when inhibit gate 82 is energized at is upper input and inhibited at its lower terminal. This is when the brushes 36 read one of the punctuation symbols in column 3. NOR gate 86 conducts for the binary words 0X0XXXX; therefore, AND gate 87 condurts for the binary words 010XXXX which is column 2. Hence, the gate 88 conducts for any column 2 symbol unless inhibited by a signal from the gate 89 responsive to the binary word XXX0000. It should be apparent from the table of FIG. 1 that the inhibit gate 88 conducts when the brushes 36 read out a binary word identifying a punctuation mark (i.e. class 3 is punction).

The next four gates represent the fourth class or "spacing" signals (i.e. letter space, tab, line feed, and carriage return). In greater detail, the AND gate 90 conducts for the single binary word 0100000 which is the space mark that separates letters into words. The combination of gates 91, 92 provides an output for the binary word 0001001 which is the horizontal tabulation or skip. The gates 93, 94 conduct for the binary word 0001010 which is the line feed. Gates 95, 96 conduct for the carriage return binary word 0001101. These four special symbols form the usual word separators here called "class 4." Other word separators such as the hyphen, apostrophe, quote marks or the like may also be identified in a similar manner. By way of example, the apostrophe is considered below an as example of an exception to standard classification.

The class 5 gate 97 conducts for any of the binary words 00XXXXX except the word separators of classes 4*b*–4*c*. These are the typewriter stunt or control symbols of columns 0 and 1.

Each of the gates 63, 82, 88, 90, 92, 94, 96, 97 feeds an individually associated bus in the group of busses 100; therefore, each of these busses represents a class of characters. Each of the busses 1–8 in group 100 is separately connected to the gate input terminals of an individually associated one of the INHIBIT gates 101–108, respectively. Associated with each of the INHIBIT gates 101–108 is an individual one of the OR gates 111–118, respectively. Each INHIBIT gate 101–108 conducts when the individually associated bus, in group 100, is energized, and the associated OR gate 111–118 conducts when any other one of the busses in group 100 is energized. For example, INHIBIT gate 101 conducts when bus 1 is energized, and OR gate 111 conducts when any one of the busses 2–8 is energized. Likewise, INHIBIT gate 102 conducts when bus 2 is energized, and the associated OR gate 112 conducts when any of the other busses 1 or 3–8 is energized. The remainder of the INHIBIT gates 103–108 and OR gates 113–118 have a similar relationship which should be apparent from a study of the drawing.

Each of the INHIBIT gates 101–108 is normally disabled by an individually associated one of the keys in the set 41–48. Each key is connected between the heavily inked dot or inhibit terminal of an associated gate 101–108 and the bus 119 which is energized when the contacts 49 are closed. The typist selects a class of characters which define a place for stopping the typewriter. By pushing one of these keys which corresponds to the selected class of characters, she removes the inhibit from the corresponding gate 101–108. Thereafter, the typewriter stops whenever the class of characters shift from any other class to the selected class. For example, if the typist wants to stop the typewriter when a space appears, she pushes the key 44 to the position which removes the inhibit from the gate 104. If she wants to stop it when a number appears, she pushes the key 42. An inspection of the drawing explains which of the remainder of the keys may be pushed to stop the typewriter at another selected class of characters.

To operate the typewriter, the typist first throws the toggle switch 40 to its "in-line" position and all of the keys 41–48 to their inhibit position. Since all of the gates 101–108 are inhibited, there is no class of characters effect as the typewriter types out. Hence, the typewriter unrestrictedly prints out or types the copy stored on the tape, at a high speed and without stopping.

When the typist sees that the typewriter is approaching the place where a correction is required, she switches the key 40 to the C/R or line-by-line mode of operation. More particularly, after the typist closes the C/R contacts on the toggle switch 40, the typewriter types out the copy, stopping at the end of every line when the carriage return gate 96 conducts to send a pulse to the "Typewriter Stop/Start" circuit 120 during the interval while the capacitor 121 is charging. If the typewriter has not yet come to the place where the typist wants to make a correction, she pushes the key 50, and the typewriter continues by typing the next line, stopping when the carriage return symbol appears.

When the typist sees that the typewriter has stopped at the end of a line and that the place where a correction is required is in the next line, she operates the toggle switch 40 and closes the "In-line" contacts. Then she decides where an editorial correction is necessary or desirable and operates one or more of the keys 41–48. For example, suppose that she wants to stop the typewriter whenever the brushes 36 first read out a number after they have been reading any other class of characters. She pushes the key 42 to the position which removes the inhibit from the gate 102; all of the other keys 41–48 are in the inhibit position.

Next, she pushes the "GO" key 50. Suppose that the typewriter is typing letters separated into words by spaces and carriage return symbols. All of the flip-flop circuits are set to their "0" side responsive to the signals passing though the various OR gates 111–118. Each of the pertinent gates 101–108 is inhibited so that none of the flip-flops is set to its "1" side. Finally, the brushes 36 read a character representing the number class of characters. Contacts 42 are open because the number key has been pushed. Therefore, the gate 102 is not inhibited, and the character read out by the brushes 36 causes a signal from gate 82 to pass through the gate 102 and set the flip-flop 126 to its "1" side. An output current flows through the capacitor 127 and reaches the change detector 128, and the typewriter stops. The typist observes the copy which has been typed. If the typewriter has stopped where a correction is required, she types the corrected copy or performs such other function as may be required by the typewriter. If the typewriter did not stop at the place for a correction, she pushes the key 50, and the typewriter continues to type until the next pulse is received by the change detector 128. Then, the typewriter stops, and she repeats the process.

All of the other flip-flop circuits 123 operate in a similar manner. If, for example she pushes the key 44 which identifies a letter space as the selected class of characters, the typewriter stops each time that the brushes 36 detect the binary word which identifies a letter-space after it has been typing any other class of characters. Again, she operates key 50 to restart the typewriter after each stop until she comes to the place for correction, which she makes in any known manner.

After all corrections are made, she either returns all of the keys 41–48 to normal or opens contacts 49 so that no change will be detected. Then she pushes the key 50, and the typewriter again types at a high speed and without stopping until it comes to the end of the tape.

Sometimes, the copy may contain only one or a few of a given class of symbols. For example, the horizontal tab may appear only at the start of paragraphs; or, numbers may appear only once or a few places in an entire letter. Therefore, the typist may reduce her restarting chores by operating the toggle switch 40 to the "in-line" mode and push the key in group 41–48 which is unique to the desired class of characters. This reduces the number of stops to perhaps one per paragraph, which may be all that is required.

By now, it should be apparent that a principal object of the invention is to cause the typewriter to take the action which the human operator expects it to take. This, in turn, depends upon the nature of the text material which is being typed. For example, a text which is full of mathematical symbols might cause the human to have one expectation, one having many foreign language quotations might cause another expectation, and one having many tables might cause yet another expectation. Those skilled in the art will readily perceive many other situations where the human expectations might shift as a function of the text material.

This suggests that there are special situations which might require special treatment. More particularly, a first situation is one where the typist might want to shift a specific character from one class to another. Another situation is where the typist might want to cancel a class change because it appears to her that such class change is an illogical one in that particular case. Finally, there may be situations where different kinds of equipment might require different actions on her part, but she does not want to be bothered by learning any new procedures. It is thought that the nature of these and other special design problems, and the solution thereto will be understood best by a discussion of how an exemplary three of these special problems are solved.

The first problem, which relates to a confusion of classes, is exemplified by the apostrophe. Actually, an apostrophe is a punctuation symbol, but it is often buried inside a word. For example, consider the word "dog's"—does the typist expect the typwriter to stop after "s"; or, does she expect it to stop after "g"? Does she expect it to stop after the "g," the apostrophe ('), and again after "s"? Probably, most people would see "dog's" as a single class of characters and expect the typewriter to stop only once, after the "s." On the other hand, perhaps more analytically-minded people might find it confusing for the typewriter to fail to make its punctuation stop. Here, then, is an example of the first situation where a typist might want to shift a symbol from one class of characters to another.

Essentially the same problem exists with the hyphen—is it a punctuation mark or a letter mark part of the word? The hyphen is cited here because it and the apostrophe exemplify somewhat opposite situations. The hyphen is very often an optional symbol which may or may not be used so that the typist will most likely pause to think before inserting it. The apostrophe, on the other hand, is almost never optional so that the typist inserts it, usually without too much conscious thought. If the typewriter is going to "think" as a human thinks, it might well treat the hyphen as a punctuation and treat the apostrophe as a letter.

To illustrate the solution to this problem, of optional classification of certain characters, the drawing shows a pair of gates 140, 141 coupled to the busses 58 in a manner which provides an output whenever the brushes 36 read an apostrophe symbol from the perforated tape. If the typist wants to have the typewriter treat an apostrophe as a letter, a manually controlled locking switch 142 is closed. Preferably, this switch is arranged so that it cannot be changed without a conscious effort because the typist should not have to stop and wonder which way the key is set. For example, key 142 might be located on the bottom or back of the typewriter where it cannot be reached under normal operating conditions.

In any event, if the switch 142 is closed, an apostrophe causes a signal to feed through OR gate 144 exactly as if it were a letter. Also, a signal is applied from switch 142 through the OR gate 145 to inhibit the gate 88 and preclude any punctuation-like response. On the other hand if the switch 142 is open there cannot be any special response to an apostrophe, and it remains in the class of punctuations.

This reference to an apostrophe is cited merely to illustrate a case where a character is changed from one class to another. Clearly, any other symbol may also be arranged for an optional class assignment, according to the individual taste of a particular typist.

The second situation is the one where the typist wants to cancel a class change. Here, an example of human expectations lies in the reaction to a letter-space (the space which separates two words). Does the human expect the typewriter to stop both when it encounters a letter space and immediately again when it encounters the first letter in the next word? Probably not. Most likely, the typist would expect the typewriter to stop at the letter space. After it is started, she would expect it to type at lease the entire word which follows. Then, the question arises, does she always expect the same reaction responsive to letters following spaces. For example, a single letter space usually separates two words, but two letter spaces usually follow a period. A different number (such as five) a letter spaces very often indicates a paragraph indentation. Does she expect the same results under each of these situations? It is here assumed, by way of example, that the typist always wants the next word typed, regardless of the number of letter spaces which may occur before the letter.

To illustrate this problem and the solution thereto, the circuit may be arranged as shown at 150–155. When the brushes 36 encounter a binary word indicating a letter-space, gate 104 conducts to set the flip-flop 148 to its "1" side. The output from this "1" side is a pulse which lasts for the period while the capacitor 149 charges. This pulse causes the change detector 128 to stop the typewriter. After an interval which is long enough to insure the stopping of the typewriter, the delay circuit 150 conducts to set the flip-flop 151 to its "1" side. The output from this "1" side inhibits the gate 152.

The typist pushes the start key 50, and the tape advances with the reader reading the next stored symbol. If it is a letter, the gate 101 conducts, and the flip-flop 64 is set to its "1" side. However, the typewriter does not stop because the gate 152 is inhibited by the output of the flip-flop 150. After a slight interval which is longer than the charge time of the capacitor, the typewriter will not stop even though the flip-flop 64 continues to stand on its "1" side. Thus, the typewriter does not stop when a letter is read out after a space. The delay circuit 153 conducts responsive to the output of the OR gate 154 to set the flip-flop 151 to its "0" side. This removes the inhibit from the gate 152, but the capacitor R has already charged, and the typewriter does not stop.

If a space is followed by any class of characters other than a letter, a signal applied to the change detector 128 also passes from the point 155 through the OR gate 154 to the delay circuit 153. The signal at 128 stops the typewriter; therefore, at this time, it is irrelevant that the flip-flop 151 resets after a delay. The reset of the flip-flop 151 enables the circuit to stop on the next shift to the letters class of characters.

Moreover, the described arrangement for circuits 150–155 allows the typist to anticipate different forms of operations by developing the habit of using the tab key at the places where she wants to stop the typewriter after a letter space type of stop and before the print out of the following word. For example, if she always indents a paragraph by means of the tab key, the typewriter may stop on a carriage return and again on a tab signal before printing out the next word. Thus, she may delete the indentation without printing out the first word in the paragraph. On the other hand, if she indents by means of repeated letter spaces, she will automatically print out the word following the letter spaces.

Thus, it is seen that the logic circuits at 150–155 allow the typewriter to treat the space as belonging in either of two classes of characters, depending upon the order in which the classes occur. Also, it allows the typist to cancel an illogical type of class change. Again, the point is that the typewriter is being adapted to "think" as the human typist thinks.

The third situation is the one where the typewriter is adapted to "think" as the typist thinks, despite the fact that different kinds of typewriters are built to operate in different ways. Here, the example is the carriage return and line feed problem.

Most modern typewriters are designed to line feed each time that the carriage return key is pushed. The typist who is familiar with these typewriters never has to push a line feed key. However, most teleprinters do not automatically line feed. The operator must push two keys. One key causes carriage return, and the other key causes line feed. The typist who is familiar with electric typewriters experiences frustration when she switches to teleprinters. For this reason, teleprinter manufacturers sometimes arrange the teleprinter to automatically supply the line feed signal whenever a carriage return key is pushed, or to wait for the line feed whenever a carriage return signal is read off the tape. Thus, the question is, "What does the typist expect the typewriter to do responsive to the carriage return and line feed signals?"

When the tape is made on an electric typewriter, there is no separate line feed, as such. The brushes 36 read out a carriage return symbol, and gate 96 conducts to stop the typewriter. When the typist restarts the typewriter, there is no line feed signal to confuse her.

If the tape is made on a teleprinter with the line feed symbols, the typist may be supplied with an option key which will allow her to connect logic circuits similar to circuits 150–155 to the gates 107, 108. This logic will cancel the stop for a line feed whenever it follows a carriage return in the same manner that the logic 150–155 cancels the stop for a letter following a letter space.

Those teleprinters which automatically insert their own line feed signals, nevertheless are compatible with conventional teleprinters insofar as the interchange of telegraphic signals are concerned. Hence, the inventive monitor circuit responds to the same manner without regard to the type of the teleprinter which is used.

A review of the foregoing makes it clear than the circuit operates in the same manner regardless of the type of teleprinter which may be used.

The foregoing description covers the most elaborate embodiment of the invention. It must be recognized that this embodiment might sometimes be a rather expensive device, considering the relative cost of a typewriter and of the electronics as compared with the secretarial time required to accomplish all of the foregoing functions. Moreover, many of the features provided here are not required for every embodiment of the invention. Therefore, we provide a number of alternative embodiments, each of which reduces the cost of the electrical circuit, sometimes at the expense of adding to the work done by the typist. However, if the typist is doing nothing more than sitting and watching the typewriter, there is no substantial waste of time or additional cost if she is required to push the key 50 more often.

One way to reduce the cost is to eliminate the inhibit gates 101–108 and the keys 41–49 connected to the bus 119. Then, the typewriter stops every time that the tape reading brushes 36 detect any shift from any one class of characters to another.

Another way to reduce costs is to eliminate or combine one or more classes of characters to reduce the number of gates which may be required. For example, a first alternative embodiment might limit the classes to letters, numbers, punctuation, and all other symbols.

Yet another alternative embodiment would make a further cost reduction by not using the ASCII code and accepting a code which minimizes the equipment required by this invention. By adding an extra track or two, the detection becomes much simpler. For example, the following codes could be used in addition to the usual code elements.

100—letters
101—numerals
011—punctuation
000—spacing

Figure 5:
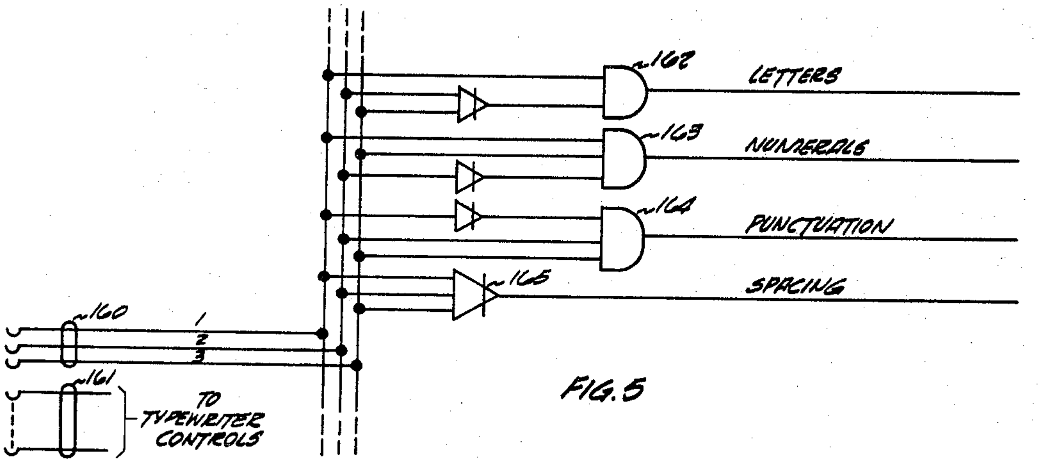
FIG. 5 is another logic circuit diagram incorporating the principles of the invention in an alternative embodiment of the invention using a code having a simpler form.

This code is read out by a logic decoder, such as that shown in FIG. 5, which might be substituted for the entire logic decoder 52 of FIG. 2.

In greater detail, FIG. 5 shows that two sets of brushes 160 and 161 are provided. The first set of brushes 160 read only the command signals which cause the typewriter to stop. The second set of brushes 161 read only the command signals which cause the typewriter to print out or perform the indicated stunt.

The above truth table indicates that the binary word 100 represents the "letters" class of characters. By inspection, it is seen that the gate 162 conducts when brushes 160 read the word 100. Likewise, an inspection of FIG. 5 discloses that the gates 163, 164, 165 conduct responsive to the binary words 101, 011, and 000, repsectively. From the above truth table, it is seen that these words represent the classes of characters: numerals, punctuations, and spacing, respectively. Therefore, the outputs of the gates 162–165 may be used in the manner shown in FIGS. 2 and 3 to stop the typewriter whenever the reader detects any change in class of characters.

Figure 6:
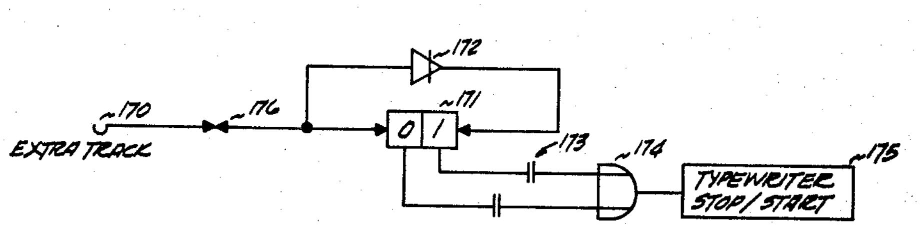
FIGS. 6 and 7 show alternative embodiments for the logic circuits of FIGS. 2–5.

FIG. 6 shows a very simple device for stopping the typewriter. Here, there is a single extra track which is read by the brush 170. Whenever the brush 170 reads a perforation, a signal is applied to set a flip-flop 171 to its "0" side and to turn off the inverter 172. Whenever the brush 170 encounters an absence of a perforation, the signal is removed from the flip-flop 171 and inverter 172. The inverter turns on and applies a signal to set the flip-flop 171 to its "1" side. Each time that the flip-flop switches from one side to another, a pulse is generated for the period required to charge the appropriate one of the capacitors 173. This pulse passes through the OR gate 174 to operate the "TYPEWRITER STOP/START" circuit 175.

The contacts at 176 coordinates the read out at brush 170 with the position of a binary word on the tape. This is to prevent the tape between the binary words from appearing to be the bit element "0." The symbol at 176 is shown as being mechanical in nature since this illustrates the invention. Actually, it is an electronic switch that is turned on when any of the brushes 161 reads a "1."

Figure 7:
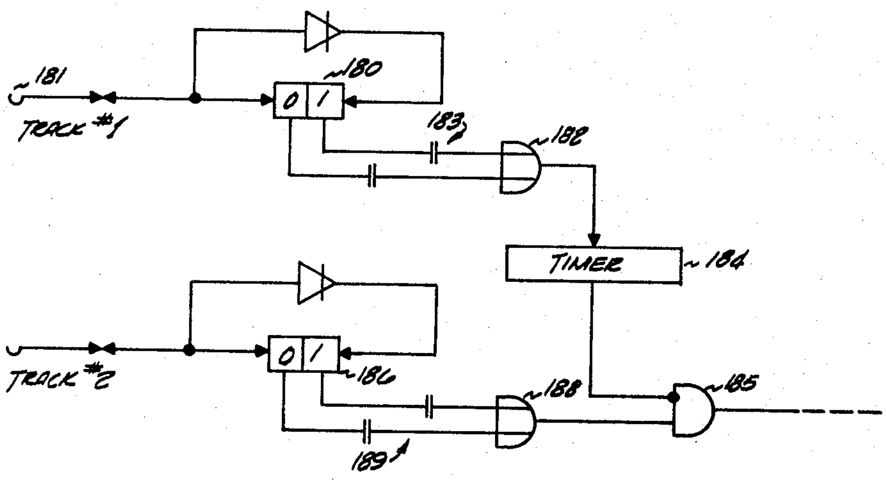

FIG. 7 extends the principle to cover two extra tracks on the tape. As explained in connection with FIG. 6, the flip-flop 180 is set to its "0" side when brush 181 reads a perforation and to its "1" side when there is no perforation. If the flip-flop 180 switches from either side to the other, a signal passes through OR gate 182 for the period while the capacitors 183 charge. This signal turns off a timer 184 for a period which is long enough to read a second track. The turning off of the timer 184 removes an inhibit from the gate 185.

If track 2 also has a change, the flip-flop 186 switches from one side to the other, and a signal passes through the OR gate 188 while one of the capacitors 189 charges. Thus, the gate 185 conducts whenever each of the brushes detects a change in the respective tracks.

From the foregoing, it should be apparent that the invention classifies the characters into a plurality of classes. The typewriter is adapted to stop whenever the class changes. The circuits utilizes the command signals to stop or not to stop the typewriter according to the human expectations. Thus, the typewriter "thinks" as the human thinks.

For a textbook treatment of logic symbols, the circuits represented thereby, and methods of using such circuits, reference may be made to either or both of the following books: "Logic Designs of Digital Computers" by Phister, or "Understanding Digital Computers" by Seigel, both published by John Wiley and Sons.

While the principles of the invention have been described above in connection with specific apparatus and applications, it is to be understood that this description is made only by way of example and not as a limitation on the scope of the invention.

The invention claimed is:

1. An automatic typewriter comprising means for typing a text including a number of alpha-numerical symbols responsive to command signals stored on a storage medium, means for classifying said command signals into a plurality of said classes, said classes being selected to include at least two different classes of alpha-numerical symbols and a plurality of operational classes, and means responsive to a detection of a change from any one of said plurality of classes of command signals to another selected class for stopping the typewriter.

2. The automatic typewriter of claim 1 wherein said classes include the classes of letters, numbers, punctuation, spacing signals, and stunts, means for sensing the class into which a command signal falls, means for selecting any one or more of these classes, and means responsive to said sensing means for stopping the typewriter when the class shifts from any other class to a selected class.

3. The automatic typewriter of claim 1 wherein said stored command signals comprise two parts, a first part indicating a classification of said symbols and a second part indicating the commanded typewriter operation, and means responsive to said first part for stopping said typewriter when said class changes.

4. The automatic typewriter of claim 3 wherein said first part is a binary coded word, means for decoding said first part word, and means responsive to said decoding means for stopping said typewriter when the class of characters shifts.

5. The automatic typewriter of claim 3 wherein said first part is a character element having either of two states, and means for stopping said typewriter responsive to a shift between said two states.

6. The automatic typewriter of claim 3 wherein said first part includes two sets of character elements, each of which may have either of two states, means responsive to a change of states in a first of said sets of character elements for detecting a change in a second of said sets of elements and means responsive to a joint shift of both of said character elements for stopping the typewriter.

7. The automatic typewriter of claim 1 and means for optionally shifting at least one specific character from one class of characters to another.

8. The automatic typewriter of claim 7 wherein said specific character is an apostrophe.

9. The automatic typewriter of claim 1 wherein means are provided for cancelling a class change when two classes occur in a preselected order.

10. The automatic typewriter of claim 9 wherein said canceled class change is from letter-spaces to letters.

11. An automatic typewriter comprising means for typing clean copy responsive to command signals stored on a storage medium, said command signals being divided into at least three classes of characters, at least one of said classes being alphabetical characters and another of said classes being numbers, means for initially causing said typewriter at high speed to unrestrictedly type said copy responsive to said command signals, means for thereafter causing said typewriter to type said copy responsive to said command signals a line at a time, said typewriter stopping at the end of each line until restarted manually, means for thereafter causing said typewriter to type said copy responsive to said command signals and means for stopping said typewriter responsive to changes from one class of characters to another selected class of characters until restarted manually.

12. The automatic typewriter of claim 11 wherein said classes of characters are letters, numbers, punctuations, spacing types, and stunts, and means whereby said means for stopping said typewriter stops it whenever said stored command signals reach any selected change of class.

13. The automatic typewriter of claim 11 and means for optionally classifying a command signal representing an apostrophe as belonging in either the class of a punctuation mark or the class of a letter.

14. The automatic typewriter of claim 11 and means for precluding said typewriter from stopping responsive to a change in classes from the class of letter spaces immediately to the class of letters.

15. The automatic typewriter of claim 11 and means for subdividing said spacing types of signals into the subclass of letter spaces and the sub-class of other spaces, and means for stopping said typewriter responsive to change of class between said sub-classes.

16. The automatic typewriter of claim 11 wherein said classes of characters are a class of letters and numbers, a class of punctuation marks, and a class spacing types of signals, and means whereby said means for stopping said typewriter stops it whenever said stored command signals reach any change of class.

17. The automatic typewriter of claim 11 wherein each of said command signals has one part representing the class of characters and another part representing specific characters.

18. The automatic typewriter of claim 17 and means responsive to each reading of a command signal for storing said one part representing the read out class of characters, means for comparing said read out one part with that stored responsive to the preceding read out, and means responsive to the detection of change of said read out one part from the part stored during the preceding read out for stopping said typewriter.

19. The automatic typewriter of claim 17 and means for further subdividing said one part into first and second parts, means responsive to the detection of a change in said first part for comparing the second part with a previously stored second part, and means responsive to said detection and comparing means for selectively stopping said typewriter.

References Cited

UNITED STATES PATENTS 3,260,340 7/1966 Locklar et al. ........ 197—20

ROBERT E. PULFREY, *Primary Examiner.*

E. S. BURR, *Assistant Examiner.*